Patented Apr. 15, 1952

2,592,591

UNITED STATES PATENT OFFICE 2,592,591

MANUFACTURE OF COMBUSTIBLE GAS

William W. Odell, New York, N. Y.

Application August 29, 1949, Serial No. 112,898

15 Claims. (Cl. 48—196)

This invention relates to a process for making and treating combustible gas. It has to do with the production of a gas rich in hydrogen and in particular the generation of a leaner gas from a richer one or from a liquid hydrocarbon without the presence of carbon black in the offtake gas. More specifically a gas having a calorific value variable at will over a range from 150 to about 800 B. t. u. per cu. ft. can be generated from hydrocarbons having a calorific value greater than 1000 B. t. u. per cu. ft. of vapor; the gas thus made can be cooled within the generating set to a mean temperature of the order of 600° to 800° F. making the use of a waste heat boiler superfluous.

It is recognized that it is old in the art to reform hydrocarbons in the presence of steam in a water gas generator or in checker chambers. It appears, however, that there are certain undesirable features attending gasification by the usual procedures. Carbon black tends to form because of excessively high temperatures which prevail in particular zones either in the fuel bed or in the specially heated checker chambers provided for the purpose. When back-run steam is introduced at the top of the superheater of a standard back-run water-gas-set, the bricks in the top courses of that chamber are usually so hot that considerable spalling of the bricks occurs because of the shock effect. Again, when oils are re-formed in a checker brick device a particular arrangement of the bricks and/or other contact surfaces must be provided, in order to most effectively re-form the oil without cracking to carbon and without a considerable heat loss as sensible heat in both the make gas and the products of combustion produced during the heating stage.

One of the objects of this invention is to promote hydrocarbon re-forming reactions making combustible gas having a lower heating value than that of the hydrocarbon initially used (re-formed) which gas is substantially free from entrained carbon black. Another object is to retain much of the sensible heat of the freshly generated gas in the system whereby the use of waste heat boilers is not necessary or economical and exposed metal parts of the generators are protected from exposure to the action of oxidants at high temperatures. Still another object is to make a well fixed oil-gas in gas generating apparatus suited for economically making long gas making runs employing a cyclic up and down run system. Other objects will become manifest from the disclosures hereinafter made.

In making synthetic hydrocarbons from water gas generated from solid fuel it has recently become common to consider the use of powdered coal, steam and oxygen as the raw materials in a continuous process; the gas thus made has a higher CO to $H_2$ ratio than desired in synthesis operations making it necessary to treat the water gas to the action of the well known shift-reaction catalylst whereby CO is converted to $CO_2$ by the reaction of Equation 1. This reaction (1) 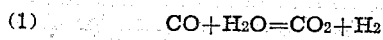$CO + H_2O = CO_2 + H_2$ is known to occur at 400° to 500° C. in the presence of an iron oxide catalyst, but it is expensive in as much as an appreciable excess of steam must be used and then condensed out of the gas and the $CO_2$ made should also be removed, as by scrubbing. Now, it is known that the heavy hydrocarbon products of synthesis reactions which do not command a good market price can be re-formed by reacting them with steam and/or oxygen, but the method and means suggested for accomplishing this do not permit the desired heat economy so far as I am aware, nor do they afford a ready means of control of the calorific value and composition of the make gas. Means and method of accomplishing these objectives in the practice of this invention are best described with reference to the drawings.

Figure 1:
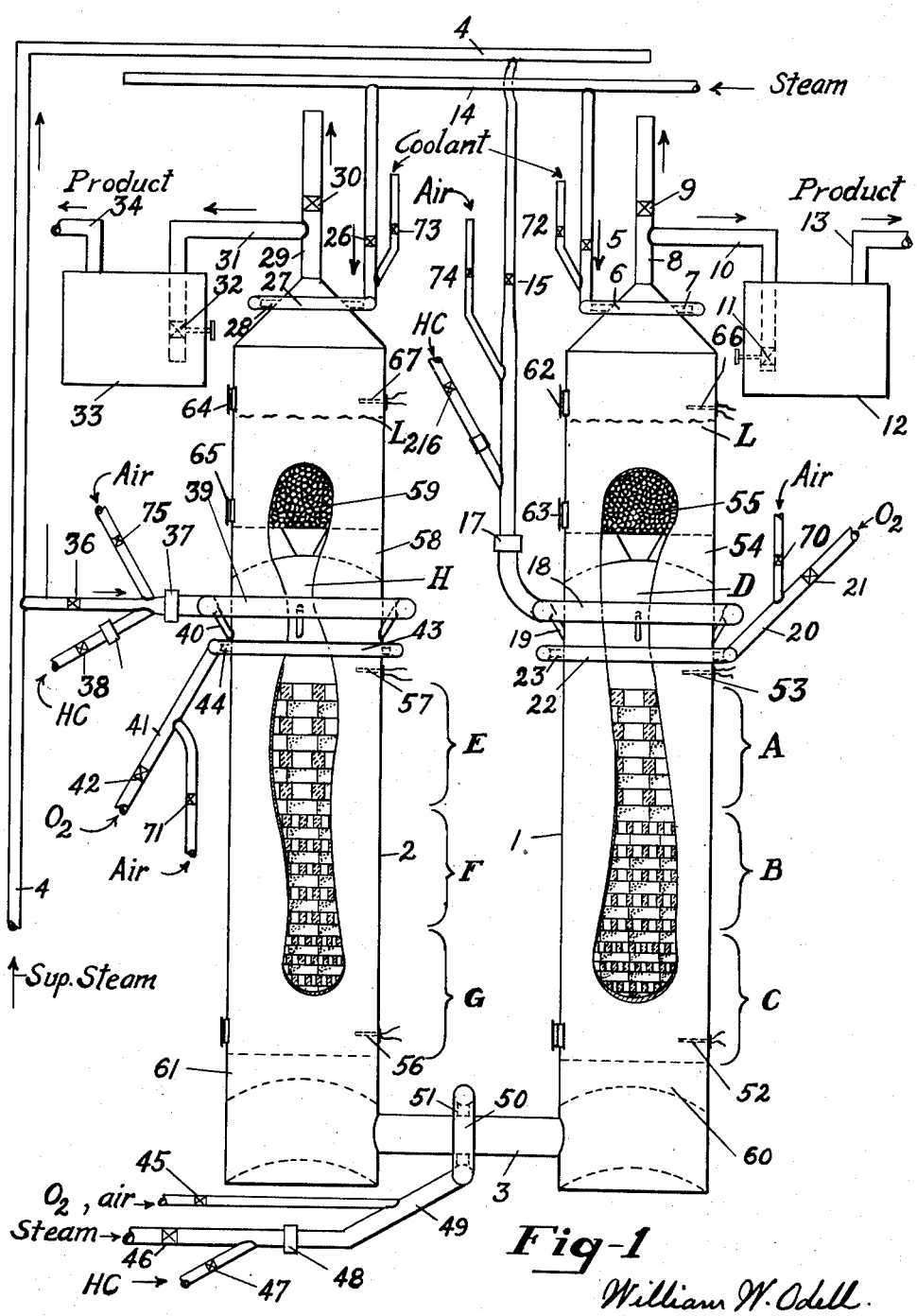
Figure 1 shows diagrammatically in elevation one form of apparatus in which the process steps of the invention may be practiced; it comprises two connected generators referred to in the description as 1 and 2 and which are depicted with portions of their walls cut away to show the interior refractory contact solids.

Referring to Figure 1, generator 1 which is connected with generator 2 at the base by crossover conduit 3 is supplied with steam at the top thereof through conduit 14, valve 5 and bustle pipe 6 which pipe has connecting nozzles 7, and has an upper gas offtake 8 with stack valve 9; said conduit is so connected that product gas passing through 8 is caused to pass through conduit 10, valve 11 in wash box 12 and out through discharge conduit 13 to known means for handling and cooling gases. Steam is also supplied to a lower zone of generator 1 through conduit 4, valve 15 and mixing chamber 17 in which chamber it mixes with hydrocarbon fuel admitted through valve 16, the mixture passes through bustle pipe 18 and nozzles 19. Oxygen or other combustion supporting fluid is supplied to the midway zone of generator 1 from conduit 20, through valve 21, bustle pipe 22 and nozzles 23. Generator 2 is similarly connected with supply lines; steam passes to the top of this generator from conduit 14 through valve 26, bustle pipe 27 and nozzles 28, stack gas passes out through offtake 29 and valve 30 whereas product gas passes through conduit 31, valve 32 in washbox 33 and out through discharge conduit 34 to known means for handling and cooling gases. Steam is supplied to the midway portion of generator 2, through valve 36 and mixing chamber 37 where it mixes with hydrocarbon admitted through valve 38, the mixture passing through bustle pipe 39, and nozzles 40 where as oxygen or other combustion supporting fluid is conducted into this zone through conduit 41, valve 42, bustle pipe 43 and nozzles 44. Steam and hydrocarbon are admitted to cross-over pipe 3 through valves 46 and 47 respectively, mixing in mixing chamber 48 and passing through conduit 49, bustle-pipe 50 and nozzles 51 where as oxygen or other combustion supporting fluid is supplied thereto through valve 45. Thermocouples located at 52 and 53 and 66 of generator 1 are suitably connected for indicating the temperatures in their respective zones, and they correspond with similarly disposed thermocouples 56 and 57 and 67 of generator 2. The upper arch 54 supports a bed of small size contact solids 55 in 1 and corresponds with a similar arch 58 and bed 59 in 2. The bottom arch 60 in 1 supports the checker bricks which comprise a plurality of courses of spaced and arranged refractory solids with different space channels in various zones as shown at A, B, and C. Generator 2 has a corresponding bottom arch 61 and similarly arranged refractory solids disposed in zones E, F, and G. The upper contact solids 55 and 59 are preferably pebbles substantially uniformly sized and of a size approximating ½ to 2 inches in diameter. Smaller solids offer more surface per unit mass for the transfer of heat but the resistance to gas flow increases appreciably as the size is decreased much below ½ inch. These pebbles are supplied to 1 through door 62 and are readily removable separate from the refractory solids in the other zones through door 63; similar doors 64 and 65 function in like manner for chamber 2. Valves 70 and 74 for introducing air into combustion chamber D of generator 1 correspond with air valves 71 and 75 of 2. Gaseous fluids which may be a hydrocarbon gas or a recirculated product of reaction are introduced into 3 through valve 47.

Figure 2:
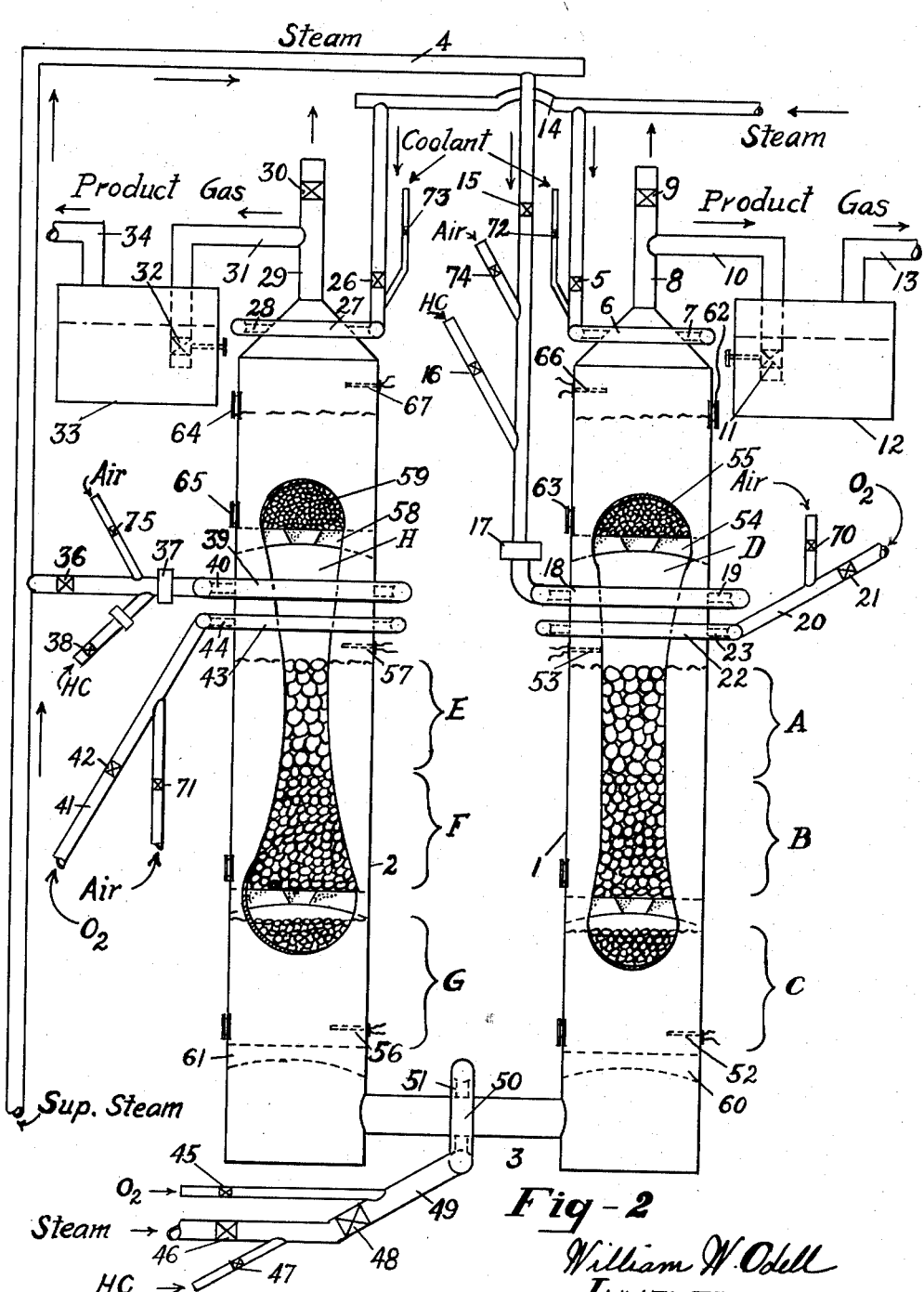
Figure 2 shows diagrammatically and in elevation twin generators similarly connected but with somewhat different arrangement of the refractory contact solids confined therein, which are particularly adapted for the re-forming of gaseous hydrocarbons continuously in back and forth cycles or intermittently with heating and run periods.

Referring to Figure 2, the same system of numbering has been employed, like numbers refer to like parts in either figure. Instead of checker brick refractories in zones A to F inclusive, the solids are pebbles in this figure, ranging in size from large to small as shown.

EXAMPLE 1

*Making combustible gas from liquid hydrocarbons, steam and oxygen*

Referring to Figure 1, the checker bricks in generator 1 are initially heated to a temperature of 1500° to 1600° F. as indicated by thermocouple 52, by burning fuel admitted to combustion chamber D through valve 16 with air admitted in considerable excess of combustion requirements through valve 70. The products of combustion are conducted down through zones A, B, and C through cross-over 3, up through zones G, F, and E of generator 2, through chamber H, pebble bed 59, and stack valve 30 to the atmosphere. Combustion (heating) is now discontinued by closing valves 16 and 70 and opening steam valve 15, purging the products of combustion out through stack valve 30. Now, after a purge of 5 to 10 seconds, stack valve 30 is closed and valve 32 in washbox 33 is opened and the hydrocarbon to be re-formed is admitted by opening valve 16; the steam and hydrocarbon mix in 17 and the mixture passes into generator 1 through bustle pipe 18 and nozzles 19. Valve 21 is now opened allowing oxygen to pass into 1 through bustle pipe 22 and nozzles 23. The hydrocarbon, steam and oxygen react forming, in this example, water gas. The hydrocarbon used in this particular case is a fuel oil. The gas formed passes down from reaction chamber D, through zones A, B, and C with increasing intimacy of contact with the arranged refractory bricks therein, across to generator 2 through 3 and upwardly with decreasing linear velocity and decreasing intimacy of contact with the arranged contact solids in zones G, F, and E, and on upwardly through combustion chamber H and finally through pebble bed 59, conduits 29 and 31, valve 32 in washbox 33 and out through offtake 34 to known means for handling water gas. During the gas-making period heat is transferred by the gas stream to the solids in zones G, F, and E, and to the pebbles in zone 59, the gas leaving through 29 at a mean temperature less than about 800° F. It is necessary to adjust the amounts and proportions of steam, oxygen and hydrocarbon material supplied to chamber D. Although these proportions may be varied appreciably, they are largely dependent on the temperature of the different reactants as supplied to generator 1. For continuous operation employing alternate up and down runs after the initial heating period, the approximate amounts are as follows:

Proportions and quantities per 1000 cubic feet of gas made are:

```
Oil ---------------------- gals     2.25
Oxygen (95%) ------------- cu. ft.  175 to 200
Steam -------------------- pounds   16-20
```

Approximate quantities per minute per 100 square feet of horizontal sectional area of either generator are:

```
Oil ---------------------- gals     22.5
Oxygen (95%) ------------- cu. ft.  1750 to 2000
Steam -------------------- pounds   160 to 200
```

After initial adjustments are made employing the reactants in proportions as just given above, final adjustment is made chiefly by adjusting the oxygen supply, by regulating valve 21 so that gas making temperatures are maintained in the checker bricks avoiding excessive temperatures as indicated by the pyrometers connected with thermocouples 52 and 56. This gas making run is continued for 10 to 60 minutes, until the temperature offtake gas, as indicated by means of of thermocouple 67, is about 800° to 900° F. A reverse run is now made by closing valves 21, 15 and 16, opening valve 11 in wash box 12, closing valve 32 and supplying steam, oil and oxygen respectively by opening valves 36, 38, and 42, supplying these materials in similar proportions as to generator 1. The gas made now passes down through zones H, E, F, and G across to generator 1 through 3 and up through zones C, B, A and D, through pebble bed 55, conduits 8 and 10, valve 11, wash box 12 and offtake 13 and is recovered. In order to make the economies which are a part of this invention, the steam supplied to generator 2 during this operation is divided so that a portion of the total steam is admitted through valve 26 and only a portion through valve 36. The proportions may be about equal through each of these two valves (26 and 36). However, the amount of steam introduced through valve 26 should be sufficient to cool the pebbles to about the temperature of the steam during the course of this run; it may be appreciably less or more than that introduced through valve 36. After a period, when the outlet gas from generator 1 has a temperature of about 800° to 900° F. as indicated by means of thermocouple 66, a reverse run is made as before but the steam supply to generator 1 is divided, a portion, say 50 per cent, passing through valve 15 and the remainder through valve 5. The up and down cycles are repeated. The length of each cycle can be varied, as will be described, the basic operations being substantially as described. Deep beds of pebbles shown at 55 and 59 of large surface area permits longer cycles than smaller beds, other factors being the same. The size of the pebbles and temperature of the steam supplied through valves 5 and 26 are also influencing factors. Another item is the amount of oxygen used. With a slight excess the temperature in zones B, C, G, and F will increase and with this increase the temperature of the gases passing through the pebbles will rise more rapidly than when less oxygen is used, hence controlling the oxygen supply is of double importance. A very economical method of controlling temperatures, after the checker bricks in zones C and G are at a temperature of the order of 1800° to 2000° F. is to introduce steam and a hydrocarbon fuel (liquid or gaseous) at the cross-over conduit 3 by opening valves 46 and 47, thus promoting endothermic reactions in the down-stream portion of the flowing gaseous stream, namely into generator 1 when the flow is up through that generator, and into 2 when the gas stream flows up through generator 2. Oxygen may also be introduced at this point, by opening valve 45, in amounts adapted to keep the temperature in the checker bricks within the chosen gas-making temperature range which, in this particular example is about 1800° to 2200° F. Zones B, C, G, and F can be maintained at a higher temperature than A and E and normally will be hotter than the latter zones even without oxygen supplied through valve 45, although this depends to a considerable degree on the depth of the checker system, on the amount of $O_2$ used and on checker spacing. It will be noted that the freshly generated gaseous products of reaction pass downwardly with increasing intimacy of contact through the hot brick mass in one generator and then upwardly at decreasing intimacy of contact with the hot refractories in the second generator. This provides the desired increasing intimacy of contact as the reactions become more and more complete and then the stream containing reaction products passes up at decreasing linear velocity affording ample time for the conversion and decomposition of undesirable gum-forming hydrocarbons present in small amounts in the freshly generated gas. The resulting gas finally passes up through the bed of small size pebbles where it is cooled by imparting heat to said pebbles.

Before citing another example, attention is called to the fact that, not only can the temperature in the checker system be controlled by the use of steam, oxygen, hydrocarbon or combinations of these to cross-over 3, and/or by the regulation of the proportions of oxygen and steam supplied to the combustion chambers D and H, but the composition of the gas made can also be controlled by adjusting these same variables. The composition of the gas made as in Example 1 without introducing additional reactants at the cross-over 3, will vary somewhat with the temperature and the depth and mass of checker bricks in each generator, but will approximate the following composition:

Volume per cent—

| | |
|---|---|
| $CO_2$ | 11.4 |
| $CO$ | 30.3 |
| $H_2$ | 56.8 |
| $CH_4$ | 0.5 |
| $N_2$ | 1.0 |
| | 100.0 |

Increasing the proportion of oxygen in the feed and decreasing the steam correspondingly raises the temperature in the checker system, increases the CO content of the gas and simultaneously reduces the hydrogen content. In operating as described in Example 1, it is preferred to have the mass of checkers in the combined zones A, B, and C and also in D, E, and F, about 25 to 35 feet deep. The depth of beds 55 and 59 preferably is 8 to 12 feet. The space channels in zones A and E may be about 3 inches, those in zones B and F about 2 inches and about 1 inch in zones C and G. These can vary, and, in fact, the spacing may be graduated from substantially the top of A and E to the bottom of C and G. Sufficient space should be allowed in zones D and H so that the reactants are thoroughly mixed and largely reacted therein before passage of the stream of reacting gases down through the adjacent checker bricks. The gas made in generator 1 passes immediately into generator 2 and there first contacts the hot bed of closely spaced refractory solids in zone G which solids afford most intimate contact with the gas stream which is a most desirable feature, and the same condition prevails with the reverse run when the gas flows down through generator 2, through 3 and up through 1 contacting first in the latter generator hot closely spaced solids in zone C.

EXAMPLE 2

*Making a water gas having a higher $H_2$ to CO ratio than in Example 1; intermittent operation*

Referring to Figure 1 the operation is substantially the same as in Example 1 except that the proportion of oxygen introduced with the steam and hydrocarbon into chambers D and H is less than sufficient to maintain a satisfactory gas-making temperature in the checker bricks which makes it necessary to periodically supply additional heat to the checker bricks. The procedure, after initially heating the bricks to a temperature of 2200° to 1800° F. in zones A to G by blasting with fuel and air through valves 16 and 74 respectively and removing the products of combustion through stack valve 30, is as follows: Open steam valve 15, and after a brief purge, close valve 30 and open 32 and the open oil valve 16 and oxygen valve 21, adjusting the rates of input of the oil, steam and oxygen so that the proportions are:

49.2 to 50.0 gals. of oil.
    2280 to 2300 cu. ft. of 95% oxygen
    420 to 480 lbs. of steam.

The temperature gradually decreases in generator 1 as the hot zone passes over into generator 2. The gas made will have a composition approximately as follows:

| | |
|---|---|
| $CO_2$ | 7.4 |
| CO | 29.4 |
| $H_2$ | 61.8 |
| $CH_4$ | 1.0 |
| $N_2$ | .4 |
| | 100.0 |

B. t. u. per cu. ft., 306.
Spec. gravity, 0.485.

If the gas making run is prolonged illuminants, ethane and ethylene appear in the gas made and the methane content increases many fold. Therefore, in making a gas for synthesis purposes when chiefly CO and $H_2$ are the desired products, the gas making run must be discontinued before the temperature in zones G and F drop appreciably below 1800° F. as indicated by means of thermocouple 56. The run is discontinued by closing oxygen valve 21, oil valve 16, making a brief steam purge, then closing steam valve 15, opening stack valve 9, closing 32, and finally supplying air and fuel to chamber H by opening valves 75 and 38 respectively. The heating operation which is now established is continued until the checkers in E are heated to about 2200° F. at which time the bricks in zone G will be about 1800° F. The heating period is now discontinued by closing valves 38 and 75, opening steam valve 36, after about 5 seconds closing stack valve 9 and opening valve 11 and then supplying hydrocarbon oil and oxygen, leaving steam valve 36 open, by opening valves 38 and 42; the gas now passing down through generator 2 and up through generator 1 and out through 8, 10, 11, 12, and 13 is recovered. This is continued as before until the temperature in generator 2 drops below a satisfactory gas making temperature which will be determined by means of the pyrometers and the gas composition. These cycles are repeated, but after operations are well under way a portion of the total steam supplied to generators 1 and 2 during the runs is introduced through valves 5 and 26 as described in Example 1. The fuel required, oil in this example, to heat the checkers, per 1000 cu. ft. of gas made will be approximately 0.6 gallon per 1000 cu. ft. of gas made, varying with the temperature of the steam, oil, and oxygen supplied, and the total oil per 1000 cu. ft. of gas made will approximate 2.45 gals. A complete cycle, in one direction, starting with a down air-fuel blast in generator 1 of Figure 1, is as follows:

Heating period, minutes_____ 4.2
    (Supplying air to chamber D at rate of 240 cu. ft. per minute per sq. ft. of horizontal sectional area of 1, and supplying oil thereto at rate of 1.00 pound per minute.)
Steam purge_____ 0.10
Gas making run down through 1 and up through generator 2, minutes_____ 5.60
    (Supplying oil at rate of 2.5 lbs. to 2.6 lbs. per minute per sq. ft. generator area; supplying superheated steam at rate of 3.40 lbs. per minute per sq. ft. generator area, and supplying 16 cu. ft. of 95% $O_2$ per min. per sq. ft. area.)
Steam purge_____ 0.10

Length of cycle, one direction, minutes _____ 10.00
Gas made per run per sq. ft. area=1000 cu. ft.

Approximate quantities of materials used per 1000 cu. ft. of gas made are:

Oxygen, 90 cu. ft. (95% pure $O_2$)
Steam, 19 pounds
Oil, total gals., 2.45 to 2.6

The heating period following the thus made run is as follows:

After the steam purge ending the gas-making run all valves supplying fluids to generator 1 are closed, stack valve 9 is opened, valve 32 is closed, and fuel and air are supplied to generator 2 into chamber H by opening valves 38 and 75; the products of combustion during this period are removed through stack valve 9 of generator 1. The quantity of oil used during the heating period amounts to about 4.0 to 4.35 pounds per 1,000 cu. ft. of gas made (product gas) and is used at the rate of about 1.00 pound per minute per square foot of horizontal sectional area of either generator, which area is hereinafter referred to as "generator area." The air used during this heating period is preferably in excess of that required for complete combustion of the oil, in this example. After about 4.2 minutes of heating, this operation is discontinued by closing air and oil valves 75 and 38, purging with steam by opening valve 36, then closing stack valve 9, opening wash-box valve 11 and conducting a gas-making run by supplying steam through valve 36, oil through valve 38 and oxygen through valve 42 in amounts as in the reverse run described in this example; the gas stream now passes down through generator 2, up through generator 1 and out through 8, 10, 11, 12, and 13 and is recovered. This run is also conducted for about 5.6 minutes. The cycles are then repeated; with reference to the 2 generators the complete double cycle is: down air blast with fuel through 1, down steam-fuel-oxygen run through 1, down air-fuel blast through 2 and a down steam-fuel-oxygen run through 2. The control of temperatures in the checker system of Figure 1 is essential for optimum results. In the foregoing examples it is desirable to have as much of the checker work system as possible at substantially a gas-making temperature without having a portion of it excessively heated. Hence, when operations as described in this Example 2 are well under way, the operator should make adjustments as follows, for optimum results: A portion of the steam used during the down runs through 1 and 2 respectively should be supplied through valves 5 and 26 to recover heat from the pebbles in beds 55 and 59 respectively and thus cool said beds. Furthermore, temperatures may be kept in proper balance by (a) Decreasing or increasing the air-supply rate to either generator during the heating period.

(b) Supplying air, fuel or both to cross-over conduit 3 during the heating period.

(c) Changing the relative amounts of fuel steam and oxygen supplied to combustion chambers D and H during the run and/or changing the rates of supply of gas-making materials to the generators (to chambers D and H).

(d) Supplying controlled amounts of gas, steam, oxygen or fuel or combinations of these to cross-over conduit 3 during the runs, and by (e) Varying the relative lengths of the heating and gas-making periods.

One skilled in the art can make these adjustments, using as a guide the temperatures prevailing in the various parts of the checker system and in the out-going gases, and by the composition of the "make" and waste gases. It seems desirable, before citing other examples, to call attention to the fact that the operation described in Example 2 can be conducted without oxygen or with mixtures of air and oxygen making, for example, a 200 B. t. u. gas. This variation is believed to be within the scope of this invention; it can be conducted without further detailed instructions.

Again, because the temperature in the pebble beds 55 and 59 are maintained, or can readily be maintained at 750° to 1080° F. it is possible to increase the $H_2$ to CO ratio in the make gas by using catalytic pebbles, ones that are catalytic to the water gas shift reaction which reaction is typified by the following equation:

(2)  $CO + H_2O = CO_2 + H_2$

When, for example, the pebbles comprise or are coated with material known to catalyze this reaction and the make gas passes through the beds while they are at a temperature of, say, 750 to 1000° F., that reaction occurs in amount proportional to the excess steam in the make gas. Accordingly, during the promotion of that reaction steam in desired amounts is introduced into the make gas either at the cross-over conduit 3 through valve 46 during the run periods, when the gas reactions or temperature distribution is aided thereby, or it is introduced into chambers D and H respectively before the make gas passes into the pebble beds 55 and 59. This procedure results in the production of a gas having a higher $H_2$ to CO ratio than can otherwise be made under the same conditions without sacrificing the economies of the invention; in fact, its practice affords an additional means of leveling temperatures in the checker brick system. It will be noted that the introduction of down run steam at the top of the generators not only economizes heat and maintains the desired temperature in the pebble beds, but, in this particular case, it also maintains catalytic activity of the catalyst. The precaution to be taken in promoting the shift reaction is to burn the fuel used during the heating period with excess air so that the products of combustion are substantially free from combustible reducing gases. The excess of air is also useful in burning off any sulfide formed on the catalyst surface by reaction with $H_2S$ during a previous gas run. Thus, the catalyst, in bed 59 for example, is exposed to the oxidizing action of the hot products of combustion during the heating period while fuel and air are supplied to chamber D of Figure 1 and sulfur is removed from the catalyst by the stack gases passing out through valve 30, and immediately thereafter, while steam, oxygen, and oil are introduced in D for a gas-making run, the gas made, along with excess steam, contacts the catalyst which is substantially freed of sulfur. Catalysts suitable for this use is a briquetted mixture of an iron oxide, alumina and magnesia. Many other materials have been proposed and found to be adapted to promote the shift reaction. For example, chromium oxide, along with iron oxide, with or without an oxide of manganese, is suitable. Briquetted mineral oxides such as hematite or limonite with or without the addition of small amounts of a solution of a salt of chromium and/or manganese which salt is so decomposed upon heating in air that an oxide of the metal forms in said briquetted material, is satisfactory. Or, a deposit of a known catalyst on silicious pebbles or on other refractory solids may be employed. Oxides that have been proposed for the shift reaction include copper oxide, vanadium, and molybdenum. Iron is the cheapest and behaves well with respect to sulfur purification of the make gas, but the presence therein of traces to 1.0 per cent of copper or small amounts of chromium is beneficial.

Referring to Figure 2, attention is called to the arch in generator 1 supporting the solids in regions B and C, and to the one in generator 2 supporting the solids in E and F; these are not required under ordinary conditions and the bed may be continuous in each generator. However, when zones C and G are maintained at very high temperatures it is usually desirable to employ the arches.

EXAMPLE 3

*Producing city gas using fuel oil and steam as gas-making materials*

Referring to Figure 1, the heating operation is initiated in generator 1 as described in Example 2 and continued until the checker bricks in zones A, B, and C are above 1350° F. and the bricks in zone G are at about 1350° F. The heating period is now discontinued and a gas-making run is initiated as follows: A brief steam purge is made taking the purge gas off through stack 29 and valve 30, after which valve 30 is closed, valve 32 is opened. Steam and oil are now introduced into 1 by opening oil valve 16 and steam valves 15 and 5. The steam entering through 5, becomes superheated in passing through pebble bed 55 and mixes in chamber D with the steam and oil introduced through bustle pipe 18 and chemical reaction is immediately started in the fluid stream which passes down serially through A, B, and C and through cross-over conduit 3 where additional oil and steam are introduced through bustle pipe 50 by opening valves 47 and 46 respectively. The stream now passes up through the checker brick system in generator 2 with decreasing intimacy of contact serially through zones G, F, and E, and finally through H, 29, 31, 32, 33 and out through off-take 34. The oil and steam introduced into generator 1 react therein forming a gas mixture comprising essentially $H_2$, CO and $CH_4$ with some illuminants; the per cent of the latter varying directly as the rate of flow of the reactant stream through generator 1 and inversely with the temperature in zones A, B, and C. The oil and steam introduced into 3 are not subjected to prolonged contact with solids at high temperature in generator 2, the gaseous stream passes through the hottest zone G in generator 2 at high velocity whereby the gas formed by reaction and by cracking in the latter generator is richer with the result that the product discharged from wash box 33 through 34 has a calorific value within controllable limits of 400 to about 750 B. t. u. per cu. ft. The total gas made ("make gas") is richer as the amount of oil injected into 3 is increased and vice versa. After the temperature in zones A and B have decreased below a satisfactory gas-making temperature and that in zone C is about 1300° F. the run is discontinued, oil valves 16 and 47 and steam valve 15 are closed, the steam valve 46 is closed and a steam purge is made by allowing steam from bustle pipe 6 to pass down through 1 across to generator 2 through 3 and up through 2 and out through 29, 31 and wash box 33. A similar heating period followed by a gas-making run are now initiated in generator 2; the stack gases formed during the heating period passes out of generator 1 through valve 9 and the make gas passes out through the wash box 12. These double cycles are repeated. The duration of the heating and gas-making periods are dependent, among numerous variables, upon:

(A) The rate of admission of reactants to the system.

(B) The surface (brick surface) which stores and gives up heat.

(C) The initial temperature of the steam introduced through valves 15, 36 and 46.

(D) The temperature of the oil used.

(E) The initial and final temperatures in the brick system selected as optimum for the particular result sought.

The final adjustment of cycle is based upon the attainment of maximum and minimum temperatures in the checker system, after chosen rates of production are established. Normally it is preferable that the maximum temperature of the bricks adjacent the combustion chambers D and H, should not be appreciably higher than 2200° F. after heating periods by combustion in said chambers. When equal quantities of fluids are supplied to each generator in unit time of operation, it will be found that a hot zone (1350° to 1800° F.) will prevail in the bottom zones of each generator and the zones A and E will vary over a wider range from the maximum of about 2200° F. following combustion period during which fuel is burned respectively in D and H to about 1300° F. or less after a down run from D and H. Thus the freshly generated gas from the hot zone of one generator passes up through the medium hot zone of the second generator, then up through a somewhat cooler zone and finally through a bed of cooler pebbles which absorbs heat from the gas. In order to maintain high efficiency of operations it is essential that the stack gases should be free of combustible matter and that any deposited carbon be burned off of the bricks during each heating period; this is accomplished by admitting sufficient air into cross-over conduit 3 during the heating periods by partly opening valve 45.

The approximate quantities of materials required per 1000 cu. ft. of 650 B. t. u. gas made are as follows:

| | |
|---|---|
| Oil for heating purposes, lbs. | 7.5 to 8.0 |
| Oil for making lean gas (admitted to the combustion chambers) during runs, lbs. | 10.0 |
| Oil for enriching (admitted to cross-over conduit 3) lbs. | 21.0 |
| Total oil, lbs. | 38.5 to 39.0 |
| Total steam, during gas-making period, lbs. | 20 to 30 |
| Air used during heating period, cu. ft. | 1750 |

The cycle may be as follows:

| | |
|---|---|
| Heating period, minutes | 4.5 |
| Steam purge, minutes | 0.1 |
| Gas-making run, minutes | 5.3 |
| Steam purge, minutes | 0.1 |
| Total duration of single one-way cycle, minutes | 10.0 |
| Make per run per square foot of generator area cu. ft. | 1,000 |
| Make per hour per sq. ft. generator area cu. ft. | 6,000 |

The approximate composition of the gas is:

| | Volume per cent |
|---|---|
| $CO_2$ | 2.3 |
| CO | 20.9 |
| Illuminants | 20.5 |
| $H_2$ | 46.6 |
| $CH_4$ | 9.3 |
| $N_2$ | .4 |
| | 100.0 |
| Calorific value B. t. u. per cu. ft. | 650 |

When the rate of make of gas is low and/or the temperature is high in the second generator (the last one through which the gas stream passes), the illuminants are further reacted forming hydrogen, methane and CO. The duration of contact of the gas with the hot checkers is somewhat more than 4 seconds when each generator confines checker bricks to a depth of 25 feet. By adjusting the relative amounts of oil, introduced during the runs, through 3 and chambers D and H the mean contact time of enricher oil vapors with the hot bricks may be varied within wide limits. Preferably the rate of introducing oil into the combustion chambers during the run should be progressively decreased and simultaneously increased through bustle pipe 50, this minimizes carbon deposition. The amount of air used during the heating period, per min. per sq. ft. of generator area is 390 cu. ft. and may be greater, and the rate of introduction of the fuel oil into the combustion chamber D or H is about 1.62 pounds per minute per square foot generator area, whereas the total gas-making oil is introduced at the rate of 6.0 pounds per minute per square foot generator area. The latter oil may be introduced in part into crossover 3, the relative amount being dependent on effect desired; for low B. t. u. gas the minimum amount may be thus introduced whereas for generation of high B. t. u. gas, a very appreciable percentage amount of the total gas-making oil used per run is admitted through 3. Steam is used with the oil to prevent cracking of the oil into its elements and also to re-form part of the oil, and to react with carbon forming CO.

As a modification of operations under the general procedure described under Example 3, when it is desirable to react hydrocarbons at mean temperatures below about 1500° F. in an atmosphere of gas or of superheated steam, forming olefinic hydrocarbons, the steps are substantially as follows, referring to Figure 1. Heat the checker bricks in both generators by promoting combustion of fuel in generator 1 as described but without admitting air through 45, 49, 50 into 3, in this manner retaining more heat in generator 1 than in 2 during this heating period, whereby the checker bricks in generator 2 are heated to a temperature of about 1400° F. in zone G and about 900° to 1050° F. in zone E. The heating period is now discontinued, a brief steam purge made, as described in Example 3 down through 1 and up through 2, and then a different type of run is made by introducing steam through 5 and 6 without admission of oil through 16, 17 and 18, or with the admission of a small amount only to produce an atmosphere of $H_2$, CO and steam in generator 1. This steam is superheated in pebble bed 55 and further heated as it passes down through zones A, B and C. Oil is introduced atomized in a gasiform medium which medium may be steam, gas or both, preferably without combustion supporting fluid, through bustle pipe 50 and into cross-over 3 in which it mixes completely with the superheated steam and passes immediately upwardly through zones G, F, E, H, pebble bed 59 and out through 29, 31, 32, 33 and 34. The temperature in zones A and B decreases during this run, imparting heat to the steam, the hot zone of generator 2 passing upwardly from G. The run is discontinued after the temperature in G has decreased to about 900° F. (higher or lower according to the characteristics of the oil used) at which time the temperature in zone E will be appreciably higher than 900° F. as indicated by means of thermocouple 57, i. e. it will be high enough for the ready ignition of fuel at the start of the subsequent heating period. The desired products are recovered from the stream discharged through 34. Now, a heating period is initiated in generator 2, after a brief steam purge, by supplying fuel through 38 and air through 75 until the checker bricks in Zone C are at a temperature of about 1400° F. and then, after a brief steam purge a gas-making run is promoted as before but in the opposite direction, by supplying steam through valve 26 and oil only through bustle pipe 50, and removing the products through 8, 10, 11, 12, and 13. Various results may be obtained at these temperatures by varying the velocity of the fluid stream through the set during the gas-making run; low velocities favor more complete cracking and also favor steam-hydrocarbon reactions whereas at high velocities less of the normally gaseous products are obtained. Thus the operator may readily control the reactions by regulating:

(A) Length of heating period
(B) Length of gas-making run
(C) Temperature in the checker bricks
(D) Rate of input (feed) of oil
(E) Relative amounts of steam and oil used
(F) Pressure in the system
(G) The nature of the oil used
(H) The amount of gas, which may be product gas obtained in the process, that is introduced with the oil through valve 68. Hydrogen or methane and hydrogen are good gases to recirculate to minimize gas formation.

Petroleum naphtha and similar products may be treated in the modified procedure above described without any appreciable amount of carbon formation and a very appreciable percentage conversion to olefins and readily condensable by products may be obtained substantially free from carbon black.

EXAMPLE 4

*Re-forming gasiform hydrocarbons, making a gas having a high $H_2$ to CO ratio without forming carbon black*

Referring to Figure 2, the materials treated (re-formed) are $C_1$ to $C_4$ hydrocarbons. The operations are much the same as described in Example 3; high temperatures are desirable in zones B, C, G and F, during the run. The pebbles in generators 1 and 2 are initially heated by promoting combustion of fuel in chamber D admitted through 16, 17, and 18, with air introduced through 74 and 45. The relative amounts of air fed through 74 and 45 are such that, at the end of a heating period of 4 to 6 minutes, the temperature in A will be about 2200° F. and the temperature in C will be about 1700° to 1800° F. That in zone G will be about 2100° F. The products of combustion are discharged through stack 29 and valve 30. Now the heating period is discontinued, valves 16, 74 and 45 are closed, a brief steam purge is made by opening valve 5 and then valve 30 is closed and 32 is opened and the run is made by opening gas feed valve 16, superheated steam valve 15 and steam valve 5, using an amount of steam in appreciable excess of the molecular combining requirements to form CO and $H_2$ by reaction with the feed gas. In this example, where a low-methane-content gas is desired, no reactant hydrocarbon is supplied to cross-over 3. The stream initially containing steam and reactant gas is passed serially through A, B, C, 3, G, F, E, H and 59 and passes out of 59 at a mean temperature below about 800° to 900° F. through 31, 32, 33 and 34 and is recovered. Typical equations representing the reactions that occur are as follows:

(3) $C_3H_8 + 3H_2O = 3CO + 7H_2$
(4) $C_4H_{10} + 4H_2O = 4CO + 9H_2$
(5) $C_2H_6 + 2H_2O = 2CO + 5H_2$
(6) $CH_4 + H_2O = CO + 3H_2$

At the start of the run as the temperature falls in zones A and B the temperature rises in zone E. The re-formed gas made during the run in generator 1 still contains some methane which may be a product of reaction or present in the feed. The gas stream passing from 1 through 3 to generator 2 now passes in most intimate contact with the highly heated pebbles in zones G and F and substantially all of the remaining methane is re-formed by reaction with steam in generator 2. As the run progresses the heat stored in the bricks in generator 1 diminishes and finally the temperature in zone G diminishes so that an appreciable amount of $CO_2$ appears in the make gas. This $CO_2$ is a result of relatively low temperature reactions such as the following:

(7) $C_4H_{10} + 8H_2O = 4CO_2 + 13H_2$
(8) $C_2H_6 + 4H_2O = 2CO_2 + 7H_2$
(9) $CH_4 + 2H_2O = CO_2 + 4H_2$

Normally these reactions are not desirable; they require much more steam per unit of gas made. However, the duration of the run period may be adjusted to allow a chosen desired amount of $CO_2$ to form in this manner for the purpose of increasing the $H_2$ to CO ratio in the make gas. This can be done, compatible with one of the basic principles of this invention of removing the reaction products from the generator at a lower temperature than in present day practice, i. e. at a mean temperature of 800° to 900° F. or lower, by adjusting the cycle. A short heating period and a prolonged run favor the production of $CO_2$ and $H_2$.

In this example (4) a mixture of gases having the following composition is employed:

| | Volume per cent |
|---|---|
| $CH_4$ | 48 |
| $C_2H_6$ | 24 |
| $C_3H_8$ | 18 |
| $C_4H_{10}$ | 10 |
| | 100 |

The rate of supplying materials may be as follows:

Steam per minute per sq. ft. generator area _____ lbs__ 6.0
Feed gas per min. per sq. ft. generator area _____ cu. ft__ 32.0

The yield of gas per 1000 cu. ft. of feed gas re-formed is 6540 cu. ft. having a composition as follows:

| | Volume per cent |
|---|---|
| $CO_2$ | 1.2 |
| CO | 26.6 |
| $H_2$ | 71.0 |
| $CH_4$ | 1.2 |
| | 100.0 |

Gas made per run per sq. ft. generator area is 1109 cu. ft. Fuel used for heating may be gas or oil; figured as oil the amount required for heating the checker bricks per heating period will approximate 6.0 pounds per 1000 cu. ft. of gas made and the feed rate should approximate 1.5 pounds per minute per sq. ft. of generator area. The cycle may be about the same as in Example 3 i. e.:

| | |
|---|---|
| Heating period, minutes | 4.5 |
| Steam purge | .1 |
| Gas making run | 5.3 |
| Steam purge | .1 |
| | 10.0 |

The total air used during the heating period is in excess of that required for the complete combustion of the fuel supplied, namely about 335 cu. ft. per min. per sq. ft. of generator area.

The inventor believes that steps outlined under Example 4 may find usefulness in re-forming the tail gases from synthetic liquid fuel plants making recycle gas, for utilizing refinery gases and the like. Similarly, employing the same steps with the same gas mixture or any other mixture of $C_1$ to $C_5$ hydrocarbons or with either of these hydrocarbons alone, the re-forming may be conducted at lower temperatures and a gas produced which has a higher calorific value than that of the re-formed gas made in Example 4, namely, higher than 326 B. t. u. per cu. ft. A city gas of 600, 700 or 800 B. t. u. or higher can be made from a richer gas most economically by employing the procedure outlined above, employing a temperature and velocity of flow of the fluid stream initially containing the reactants adapted to the desired gas heating value, using the twin generators with the pebble bed top zones, and removing the make gas at much lower temperatures than in standard water gas practice.

Before defining this invention by claims, attention is called, somewhat summarily, to the following: Oil gas or re-formed-hydrocarbon gas or mixtures of CO and $H_2$ may be generated substantially free from suspended carbon black as discharged from the set. Any carbon in the gas passing from one generator to the other is eliminated in the second generator by virtue of thorough mixing with an oxidant added at the crossover 3 of the figures through bustle pipe 50 and the subsequent intimate contact with the highly heated solids in the bottom zones, B and C or F and G. Considering a run down through 1 and up through 2, any carbonaceous matter deposited in 1 in zones A and B or in A, B and C, is burned off during the next period which is a heating period in which excess air is used. Moderate superatmospheric pressures in the set, particularly during the gas-making runs, favor the reactions in complete gasification; pressures of the order of 5 to 300 pounds are preferred. However, when it is desirable to convert high molecular weight hydrocarbons to gasiform products containing a maximum amount of low-boiling readily condensable products it is preferable to operate with a maximum temperature in the hottest zones of 1150 to 1500° F. and to employ high linear velocities and pressures of the order of 50 to 1000 pounds per square inch gage, or higher. Other factors being the same, the yield of gas is lower and the yields of liquid by-products are higher the higher the linear velocity of the stream initially containing reactant materials through the hot zone. Preheating the hydrocarbon reactant material before introducing it into the generator is advantageous both for gasification and for making the maximum conversion to liquid by-products. When it is desirable to make the maximum amount of aromatic liquid by-products from fuel oil, petroleum naphtha and the like, the maximum temperature after the heating period may be 1600° F. Benzene, toluene, and xylenes may be prepared in this manner. The pressure, temperature, cycle and stream velocity may be adjusted for any particular raw material for optimum yields of particular products. When the velocity is extremely high, providing less than one second contact time with the hot solids diolefins form which are not usually desirable. The solids in the generators are so sized that the gas stream passes through the hot solids at high linear velocity and intimate contact and with less intimate contact with the solids in the cooler zones. Referring, for example, to Figure 1 when oil is added through bustle pipe 50 as the stream flows from 1 to 2 and up through G, F, and E, the oil first contacts the hottest, closely spaced, staggered checker bricks in G and then passes through the cooler checkering in F and E with decreasing intimacy of contact with the bricks; this helps to destroy diolefin and gum-forming compounds. Again, the fluid passing down through 1 may be largely or entirely steam whereby the oil introduced into 3 immediately mixes therein with the thus highly superheated steam and the stream containing this mixture passes directly into intimate contact with the solids in zone G and on up through generator 2. The nature of the products formed and the relative amounts of gas and liquid produced depend largely on the velocity through G and F, the mean temperature in those zones and the relative amount of steam and hydrocarbon oil injected into 3. Very high temperatures of the steam and of the solids in zone G, with an appreciable excess of steam, favor complete gasification, the main products being CO and $H_2$; medium temperatures favor the generation of gas containing chiefly CO, $H_2$, $CO_2$ and $CH_4$ whereas at lower temperatures and/or high velocities liquid by-products form. Nothing has been said thus far about using $CO_2$ in lieu of some of the steam as an oxidant but this, which in itself is not a new feature, may be done when a high CO content is not objectionable in the make gas. The contact solids in the generators have been referred to as "refractory solids" but it may be advantageous, when operating at temperatures below 1700° F., to employ metals or alloys that withstand the temperature and the prevailing gaseous atmosphere. Iron induces cracking and is otherwise reactive and is not usually desired other than in alloy form as with chromium copper vanadium, molybdenum and certain other metals. The term refractory solids, as used herein, is intended to include metals that withstand exposure to the operating temperatures.

As a method of controlling temperatures in the various zones of the generators, it is sometimes desirable to inject some steam with the air during the heating operation. Referring to Figure 1, when generator 1 is supplied with a fluid fuel through valve 16 and air for its combustion is introduced through valve 70 or 74, steam may be injected through valve 5. This prevents the checker bricks in zones A and B from becoming overheated, prevents excessive deposits of carbonaceous matter on the bricks in those zones and permits the use of more air through 45 and bustle pipe 50 to burn the remaining combustible matter in the fluid stream passing out of generator 1 through 3. In this manner a leveling out of temperatures of the gas stream occurs which permits a longer heating period without overheating particular zones and increases the gas-making capacity of the set per unit of time.

When the pebbles, or equivalent solids, in beds 55 and 59 of the figures are used solely as a heat-exchange heat-economizing medium the bed depth is dependent on the length of the run and heating period. Employing pebbles of 1 inch mean diameter and of fairly uniform size it will be found that a bed depth of 7 feet will be sufficient for a ten minute cycle (one heating and one run period) or, when the operation is a continuous gas-making run and the cyclic changes are merely changes in direction of flow and these changes are made at 10-minute intervals, a bed of 7 feet depth is sufficient. However, when 2 inch pebbles are employed and the cycle is 10 minutes the depth of beds 55 and 59 (each) should be about 14 feet whereas with half inch pebbles a bed depth of 4.5 to 5.0 feet is satisfactory. When the gas-making run is continuous, as in Example 1, even though gaseous hydrocarbons are substituted for oil, the temperatures in B, C, G and F will remain quite constant; the temperature of the gas stream passing out through E, when the run is from generator 1 to 2, will rise during the run and likewise when the reverse run is made from generator 2 to 1 the temperature of the gas passing up out of zone A rises during the run. The length of these runs may be regulated according to the temperature indicated by the thermocouples 66 and 67; when the temperature indicated is, say, 800° to 900° F. a run reversal is made. The temperature of the outlet gas as indicated by means of the thermocouples 66 and 67 will remain at 250° to 400° F. throughout the major portion of the runs when the pebbles are uniformly sized. On a ten minute run down through generator 1 and up through 2, employing pebbles one inch mean diameter in beds 55 and 59 the temperature of the gas as it passes up out of bed 59 will remain at 350° to 400° F. for about 8 to 9 minutes if the bed depth of these pebbles in 59 is 8 to 9 feet, provided the temperature of the steam entering through valve 26 on the reverse run is not hotter than 300° F. and sufficient of it is used during this reverse run to cool the bed (59) to about 300° F. Although the examples show only steam supplied from above beds 55 and 59, it will be obvious that a gaseous hydrocarbon and/or a combustion supporting gas can be used with the steam as a means of cooling the pebbles thereof or substituted for the steam. Steam is preferred because of its high specific heat and for other reasons; in order to obtain maximum efficiency and economy in making gasiform reaction products it is essential that the pebbles in these beds be sufficiently cooled on the down runs so that make gas passing up through them on the up runs will be cooled therein to a suitably low temperature such as 800° to 1000° F. at the end of the up run period, and to a lower temperature during the major portion of the gas-making runs. Such a fluid (air, oxygen, gaseous reactant) may properly be termed a coolant and may be introduced into generators 1 and 2 respectively through valves 72 and 73. Again, for producing particular results, generator 1 may contain checker bricks substantially as shown in Figure 1 and generator 2 may contain pebbles instead as shown in Figure 2. Such a combination would be advantageous when different feed materials are supplied to the different generators, when the temperatures are widely different in 1 than in 2 and different reaction products are made on alternate runs. For example, when a very high molecular weight oil is used as a heating fuel and for re-forming into CO and $H_2$ generator 1 may be filled with the checkers as shown in Figure 1. Assuming that the gas thus made (CO and $H_2$) is to be converted in part into methane in generator 2 by exothermic synthesis reactions typified by equations 10 and 11 below, the filler in zones E, F, and G of generator 2 may advantageously be pebble catalysts. The temperature in the latter zones should be kept below 1450 F., the pressure should be 20 to 50 atmospheres or more and the reverse run from 2 to 1 is chiefly to cool the solids in 2 and return the heat to generator 1; this is done by admitting coolant through valve 73. If the latter coolant is steam or comprises steam it functions as an activator of the catalyst and aids in keeping carbonaceous deposits on the bricks in zones A and B at a minimum.

Attention is called to the fact that in all of the examples not only does the heating fluid flow down through the first generator of the pair but the subsequent run is also entirely down through that generator, however, when it is desirable to remove excess heat from zones A and E, in order to remove gases from the top of 1 and 2 of the figures at a minimum temperature split runs can be made. It is believed that this and other modifications not specifically indicated by examples will become apparent.

This application is a continuation in part of my application Serial No. 670,408, filed May 17, 1946, now Patent No. 2,494,576.

Having described my invention so that one skilled in the art can practice it, I claim:

1. The process of making combustible gas in cycles in a gas-making set comprised of twin generators A and B connected at the bottom adapted for the flow of a fluid through them serially in either sequence each of which generators has a deep substantially continuous pervious bed of refractory solids disposed in a zone below the top zone thereof, which process includes the cycle of steps comprising, establishing hot zones having temperatures in the approximate range of 1300 to 2200° F. in the beds of said refractory solids in A and B by initiating combustion of a fluid fuel in a combustion chamber of said generator A above the bed of refractory solids therein passing the hot products of combustion down through the latter bed with increasing intimacy of contact with the refractory solids thereof and up through the bed in B with decreasing intimacy of contact with the refractory solids thereof, then making said combustible gas by passing a gasiform stream initially comprising a mixture of an oxidant including superheated steam and a fluid hydrocarbon fuel downwardly through the deep bed in A from above with increasing intimacy of contact with the thus heated refractory solids therein and upwardly through the bed in B with decreasing intimacy of contact with the heated refractory solids therein, and discharging the gas thus made from above the latter bed substantially free from suspended carbon, said refractory solids being so disposed in each generator that they afford increasing contact surface per unit of volume progressively downwardly whereby the variation in intimacy of contact of gas and solids is obtained.

2. The process defined in claim 1 in which the said hydrocarbon fuel is initially preheated to a temperature of the order of 400° to 1000° F. before admixture with said oxidant.

3. The process defined in claim 1 in which the steam initially mixed with said hydrocarbon fuel is at a temperature in the range 450° to 1000° F.

4. The process defined in claim 1 in which the pressure in the generators A and B at least during the gas-making period is appreciably greater than atmospheric pressure being of the order of 10 to 1000 lbs. per square inch gage.

5. The process defined in claim 1 in which only incomplete combustion of said fluid fuel is promoted in the generator A during the heating period, and in which combustion supporting fluid is also introduced into the system during this period at the cross-over conduit connecting said generators A and B whereby solids of both beds are simultaneously heated by direct contact with burning fuel and hot gases during the heating period.

6. The process defined in claim 1 in which the said oxidant comprises essentially oxygen and steam.

7. The process defined in claim 1 in which the said oxidant comprises essentially oxygen and steam in the ratio 4 to 12 cubic feet of oxygen to 1 pound of steam.

8. The process defined in claim 1 in which the said hydrocarbon fuel is gaseous at standard temperatures and pressures.

9. The process of making combustible gas in cycles in a gas making set comprised of twin generators A and B connected at their bases and adapted for the flow of a fluid through them serially in either sequence, each of which generators has a deep pervious bed of specially arranged refractory solids disposed in a zone thereof below the top zone, a pervious mass of small-size heat-exchange solids disposed in substantially the top zone thereof and each of which has a spacious combustion chamber between said bed of refractory solids and said mass of heat-exchange solids, which process includes the cycle comprising, establishing hot zones in each of said beds in the temperature range of 1300 to 2200° F. by initiating combustion of a fluid fuel in the combustion chamber of said generator A above the said bed of refractory solids confined therein passing the hot products of combustion down through the latter bed and up through the bed in generator B then making said combustible gas by passing a gasiform stream initially comprising a mixture of a fluid hydrocarbon fuel and an oxidant including superheated steam downwardly through the heated bed in A with increasing intimacy of contact with the solids thereof and upwardly through the bed in generator B with decreasing intimacy of contact with the heated refractory solids thereof, passing the gas thus made upwardly as a stream through the pervious mass of heat exchange solids in B imparting heat thereto and correspondingly cooling the gas, and removing the thus cooled gas and recovering it, said specially arranged refractory solids being so disposed in each generator that they afford increasing contact surface per unit of volume progressively downwardly whereby the variation in intimacy of contact of gas and solids is obtained.

10. The process defined in claim 9 in which a fluid hydrocarbon fuel is introduced into the flowing gaseous stream during the gas-making period after the latter stream has passed down through the bed in A but before it passes up through the bed in B.

11. The process defined in claim 9 in which a fluid hydrocarbon fuel and an oxidant is introduced into the flowing gaseous stream during the gas-making period after the latter stream has passed down through the bed in generator A but before it passes up through the bed in generator B.

12. The process described in claim 9 in which said mass comprises a catalyst and in which the gas generated in the said beds is further reacted catalytically as it passes through said mass by virtue of contact with said catalyst.

13. The process defined in claim 9 in which the mean temperature of said mass is maintained below 800° to 900° F.

14. The process defined in claim 9 in which the mean temperature of said mass is such that the freshly generated gas is cooled, in passing through said mass, to a temperature of 600° to 900° F.

15. The process of making combustible gas in cycles in a gas generating set comprised of substantially vertically walled twin generators A and B connected at their bases and adapted for the flow of a fluid through them serially in either sequence, each of which generators has a deep pervious bed of specially arranged refractory solids disposed in a zone thereof below the top zone, a deep pervious mass of small size heat exchange solids disposed in substantially the top zone thereof, and a spacious combustion chamber between said bed of refractory solids and said mass of heat-exchange solids, which process includes the twin cycle comprising, first heating the solids in the beds in A and B to a temperature in the range of 1300 to 2200° F. by supplying a combustion supporting fluid and a fluid fuel to the combustion chamber in A initiating combustion of the latter fuel in the latter chamber passing the hot gases resulting therefrom down through the bed in A and up through the bed in B and out through the mass in B, then discontinuing the heating operation and promoting a gas-making run by introducing super-heated steam and hydrocarbon fuel into said chamber in A passing the stream initially comprising the latter reactants down through the bed in A with increasing intimacy of contact with the solids thereof, up through the heated solids in the bed in B thereby forming said combustible gas, passing the stream containing said combustible gas up through the mass in B heating it and correspondingly cooling said stream, discharging said latter stream from above the latter mass and recovering the said combustible gas, then discontinuing the run and promoting a similar reverse heating step by simultaneously passing a combustion supporting gas and a fluid fuel into the combustion chamber of B igniting the latter fuel therein conducting the hot gas stream resulting therefrom down through the bed in B with increasing intimacy of contact with the solids thereof and up through the bed in A with decreasing intimacy of contact with the solids thereof and out of generator A through said mass in A, then discontinuing the heating step and promoting a reverse run by introducing superheated steam and fluid hydrocarbon fuel into said chamber in B simultaneously passing steam down through said mass in B cooling said mass and correspondingly superheating the latter steam, into the latter chamber, passing the stream initially containing the latter components from the latter chamber down through said bed in B with increasing intimacy of contact with the solids thereof up through the bed in A with decreasing intimacy of contact with the solids thereof thereby making additional combustible gas, passing the hot gas thus made as a stream up through the mass in A heating the latter mass and correspondingly cooling the latter gas, and discharging the thus cooled gas from above the latter mass and recovering it, said specially arranged refractory solids being so disposed in each generator that they afford increasing contact surface per unit of volume progressively downwardly whereby the variation in intimacy of contact of gas and solids is obtained.

WILLIAM W. ODELL.

REFERENCES CITED

The following references are of record in the file of this patent:

UNITED STATES PATENTS

| Number | Name | Date |
|---|---|---|
| 819,666 | Lowe | May 1, 1906 |
| 883,466 | Lowe | Mar. 31, 1908 |
| 883,681 | Gerdes | Mar. 31, 1908 |
| 1,817,726 | Vinther | Aug. 4, 1931 |
| 2,002,863 | Nagel | May 28, 1935 |
| 2,133,496 | Winkler et al. | Oct. 18, 1938 |